United States Patent [19]

Stallings

[11] Patent Number: 5,347,697
[45] Date of Patent: Sep. 20, 1994

[54] TOOL FOR ASSEMBLING A TIRE LIFT MECHANISM

[76] Inventor: Hulon D. Stallings, 8730 Sarah La., Grosse Isle, Mich. 48138

[21] Appl. No.: 94,812

[22] Filed: Jul. 20, 1993

Related U.S. Application Data

[62] Division of Ser. No. 758,797, Sep. 12, 1991, Pat. No. 5,251,876.

[51] Int. Cl.$^5$ .............................................. B25B 27/14
[52] U.S. Cl. ........................................ 29/280; 294/94; 29/282
[58] Field of Search ................... 294/93, 94; 254/131; 269/49; 29/282, 263, 280; 81/451, 454

[56] References Cited

U.S. PATENT DOCUMENTS

| | | | |
|---|---|---|---|
| 2,393,587 | 1/1946 | Bugg et al. | 269/49 |
| 3,007,241 | 11/1961 | Gonzalez | 29/282 |
| 3,479,722 | 11/1969 | Maness | 294/94 |
| 3,945,104 | 3/1976 | Brookover | 29/282 |
| 3,957,247 | 5/1976 | Haller et al. | 254/131 |
| 4,072,335 | 2/1978 | Tift et al. | 294/93 |
| 4,581,963 | 4/1986 | Kim | 81/454 |
| 4,659,126 | 4/1987 | Breck et al. | 294/93 |

Primary Examiner—Robert C. Watson
Attorney, Agent, or Firm—Dykema Gossett

[57] ABSTRACT

An improved tire lift mechanism is disclosed in which a drive tube selectively rotates a driven shaft to raise and lower a cable fixed to a spare tire. The drive tube is connected to the driven shaft through a connection formed of a plurality of circumferentially-spaced pins which are received within notches in the driven shaft. Spaces are provided between the drive pins. Liquids in the area of the connection drain outwardly of the spaces and do not freeze in the area, which could prevent use of the tire lift mechanism. A spring is disposed between the driven shaft and the drive tube to eliminate looseness, and resultant rattling. Finally, a method of assembling the tire lift mechanism is disclosed in which the drive tube is formed of a pair of telescopic tube members. The members are telescopically moved relative to each other to a collapsed position, and the mechanism is fixed to the underside of a vehicle. The tube members are then telescopically moved to an expanded position with the tube moving through a bearing member to mount the tire lift mechanism to the underside of a vehicle. This reduces the complexity of assembling the tire lift mechanism over prior art assemblies.

8 Claims, 4 Drawing Sheets

TOOL FOR ASSEMBLING A TIRE LIFT MECHANISM

This is a divisional of copending application Ser. No. 07/758,797 filed on Sep. 12, 1991, now U.S. Pat. No. 5,251,876.

BACKGROUND OF THE INVENTION

This application relates in general to an improved drive for a tire lift mechanism, and also to a simplified method of assembling such mechanisms.

It is known to store a spare tire at the underside of a vehicle, particularly in vans. Tire lift mechanisms are typically utilized for raising and lowering the spare tire from beneath the vehicle. A cable extends from the lift mechanism and a rotative drive is arranged upon a first axis for lowering and raising the cable, to raise and lower the spare tire. An access opening may be formed through the rear of the vehicle body, and a tool such as a jack handle may be inserted through the access opening and used to raise and lower the cable.

One particularly successful example of such a mechanism is disclosed in U.S. Pat. No. 4,915,358. A drive tube is selectively driven by a tool for raising and lowering a cable. The drive tube is rotatably received in a bearing formed beneath tile underside of a vehicle, and drives a driven shaft, which is connected to the actual drive for the cable. The connection between tile drive tube and the driven shaft is a universal-type connection wherein the drive tube has a plurality of circumferentially-shaped drive pins received in slots in the driven shaft. The drive pins may pivot relative to the slots such that the axis of rotation of the drive tube may be at an angle relative to the axis of rotation of the driven shaft. This facilitates the use of the assembly, such that a user need not bend to a low vertical position to raise and lower the tire.

Although the above-discussed patented mechanism has proven successful, several improvements may still be made. The universal connection of the drive tube to the driven shaft includes a radially outwardly disposed cup. This cup may retain water, which may freeze, locking the connection. Further, the connection between the drive tube and the driven shaft may result in undesirable rattling and looseness. Lastly, it is somewhat difficult to mount the tire lift mechanism to the underside of a vehicle, and then position the drive tube through its bearing mount. These three area are improved in the present invention.

SUMMARY OF THE INVENTION

In a disclosed embodiment of the present invention, a drive tube is connected to a driven shaft through a universal connection which includes a number of drive pins fixed to the drive tube, and received in notches in the driven shaft. The pins may pivot within the notches, but still transmit drive. The universal connection includes spaces between the drive pins which extend radially outwardly of the connection. Water may drain outwardly through these spaces.

The drive tube also includes plates spaced on each axial side of a driven shaft plate which includes the notches. The drive pins extend between the drive tube plates. A spring is positioned between the driven shaft plate and one of the plates from the drive tube. This spring ensures that the drive tube is biased towards the driven shaft, eliminating rattling and undesirable looseness in any relative angular position.

In a final feature of the present invention, a unique tool is disclosed for initially assembling the tire lift mechanism. The drive tube consists of a pair of telescopic tube portions which may slide relative to each other. To assemble the tire lift mechanism to a vehicle, the mechanism is first attached to the underside of the vehicle. At that time, the drive tube portions are telescoped upon each other to a collapsed position. The unique tool is inserted into the drive tube, and one tube portion slides telescopically relative to the other. The one tube portion is pulled through a bearing mount. This simplifies the assembly of the tire lift mechanism of the present invention.

Further objects and features of the present invention can be best understood from the following specification and drawings, of which the following is a brief description.

DETAILED DESCRIPTION OF A PREFERRED EMBODIMENT

Figure 1:
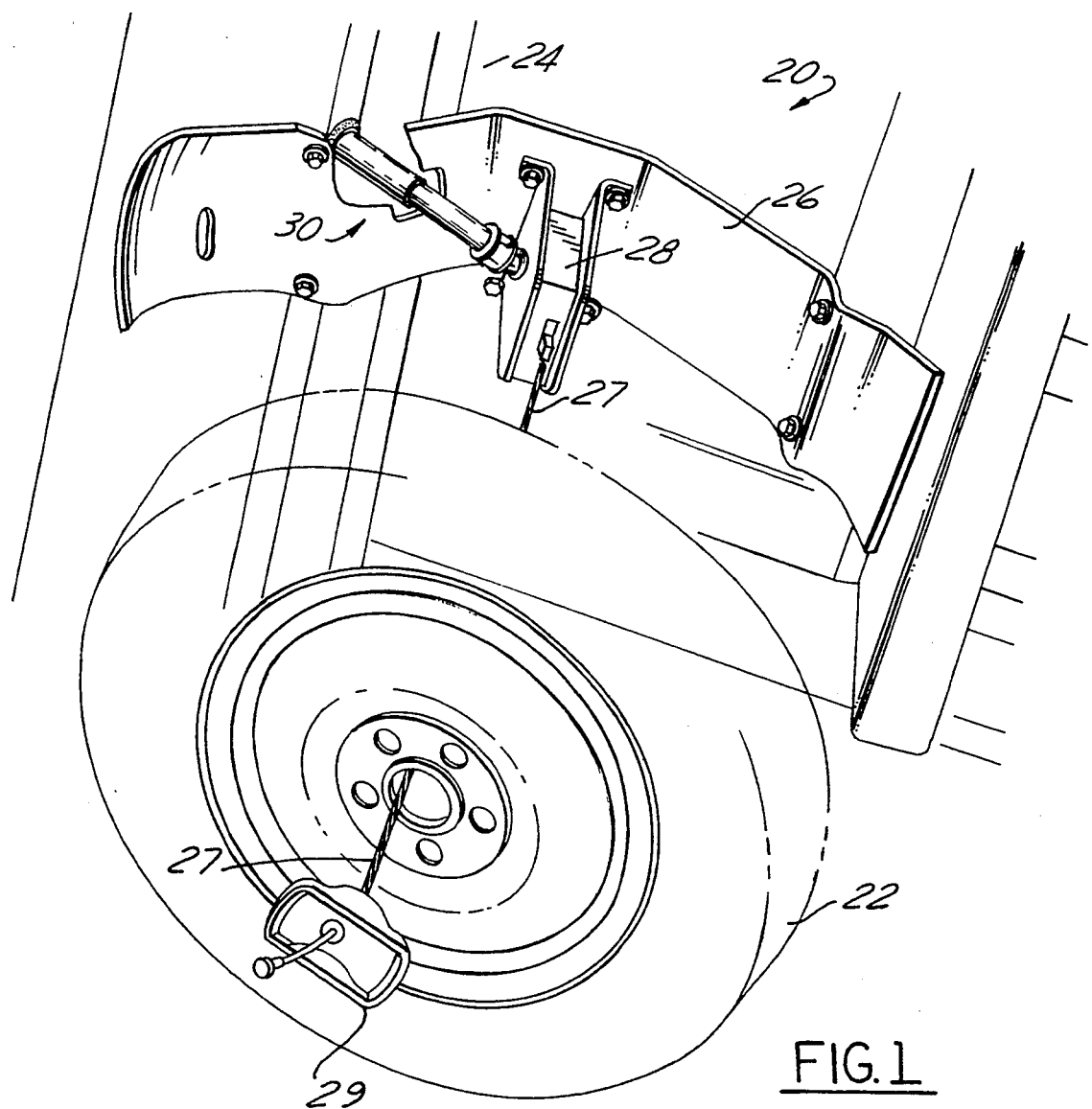
FIG. 1 is a perspective view of the underside of a vehicle including the inventive tire lift mechanism.

FIG. 1 illustrates tire lift mechanism 20 for raising and lowering spare tire 22 from beneath the underside 24 of a vehicle. Bracket 26 mounts an assembly 28 which includes known structure for raising and lowering cable 27. Cable 27 is fixed to member 29 which is received in the opening on spare tire 22.

A manual drive assembly 30 for selectively driving assembly 28 to raise and lower cable 27 will be disclosed below. The details of the drive within assembly 28 may be similar to that disclosed in U.S. Pat. No. 4,915,358, the disclosure of which is hereby incorporated by reference. It should be understood, however, that the details of the drive within assembly 28 form no part of this invention, and thus any type of drive may be utilized for raising and lowering cable 27.

Figure 2:
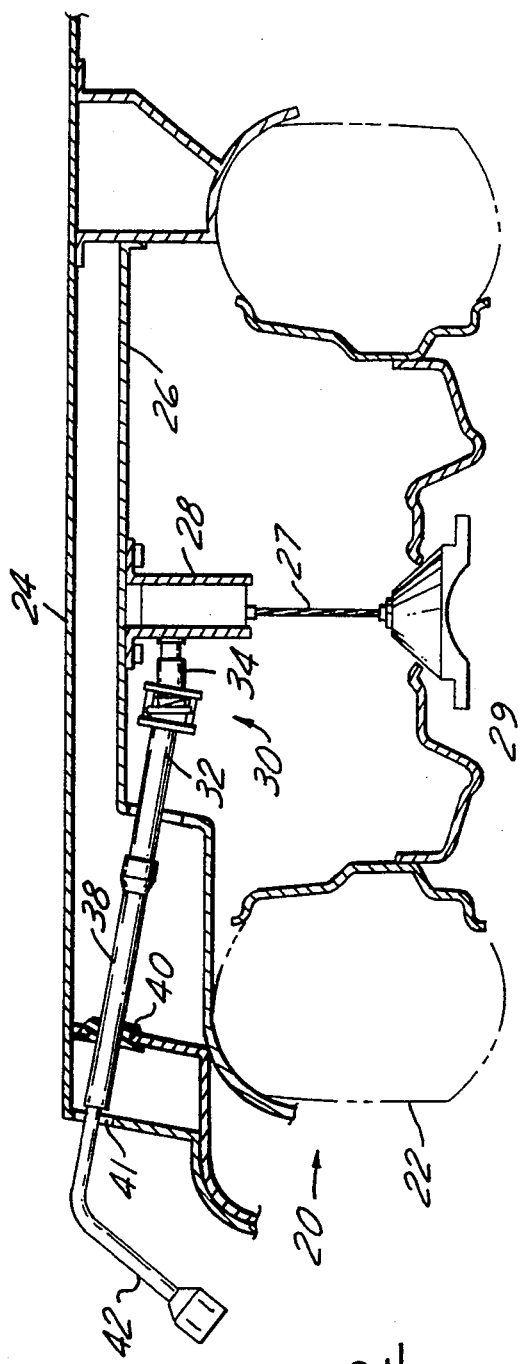
FIG. 2 is a largely schematic cross-sectional view of the inventive tire lift mechanism.

FIG. 2 is a largely schematic cross-sectional view illustrating features of tire lift mechanism 20. Member 29 retains tire 22 beneath vehicle body 24. Bracket 26 mounts assembly 28 for raising and lowering cable 27. Drive assembly 30 includes drive tube 32 which selectively drives driven shaft 34. Driven shaft 34 drives structure within assembly 28 to raise and lower cable 27.

Drive tube 32 consists of a first inner tube portion 36 and a second outer tube portion 38. Outer tube portion 38 is rotatably received within bearing 40 on vehicle underside 24, and rotates with inner tube 36. Outer tube 38 may slide telescopically on inner tube 36.

An access opening 41 is formed in the rear of the vehicle. A tool, such as a jack handle 42 may be inserted through opening 41 and into outer tube 38 and may be used to rotate outer tube 38 and inner tube 36, which in turn rotates driven shaft 34. Other tools, such as a lug wrench may be used. Driven shaft 34 raises and lowers cable 27 to raise and lower spare tire 22.

Figure 3:
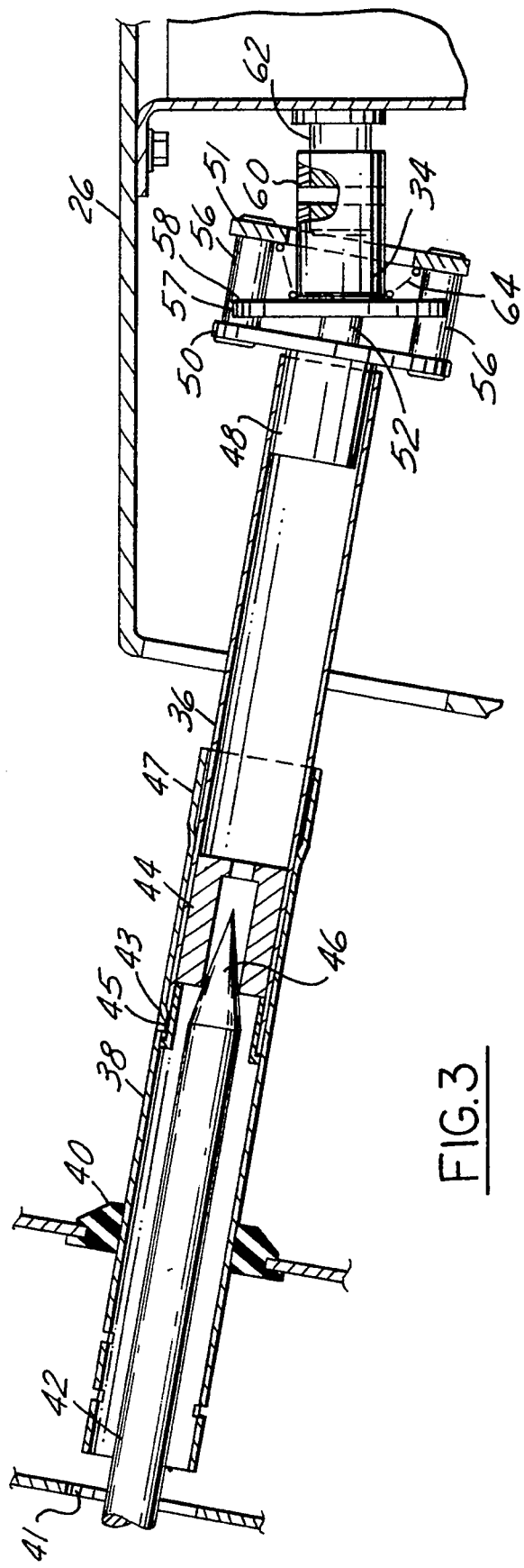
FIG. 3 is a cross-sectional view through the tire lift mechanism shown in FIG. 2.

As shown in FIG. 3, tool 42 includes a first conical end which is received within a drive connection 44 in inner tube 36. Outer tube 38 has lip 43 which snaps into notch 45 in inner tube 36, locking the two together and preventing any further telescopic movement. A forward end of outer tube 38 is angled outwardly 47 to facilitate sliding of outer tube 38 on inner tube 36.

Inner tube 36 includes plug 48 which is fixed to first plate 50. A plurality of drive pins 56 connect plates 50 and 51, which are on spaced axial sides of plate 57 associated with driven shaft 34. Plate 57 includes a plurality of notches 58 which pivotably receive drive pins 56. Bearing 52 is pivotally received within a central portion of driven shaft 54. Driven shaft 54 includes sleeve member 60 received on shaft 62, which is connected to drive structure within assembly 28.

If drive tube 32 is pivoted with respect to driven shaft 34, drive pins 56 pivot in notches 50. When drive tube 32, and thus drive pins 56 are rotated, notches 58 and thus plate 57 rotate, which rotates shaft 62 to raise and lower cable 27. Spaces are formed circumferentially between drive pins 56 to allow leakage of water outwardly of the connection.

Coil spring 64 biases plate 50 towards plate 57. This eliminates looseness and rattling between drive tube 32 and driven shaft 34.

Figure 4:
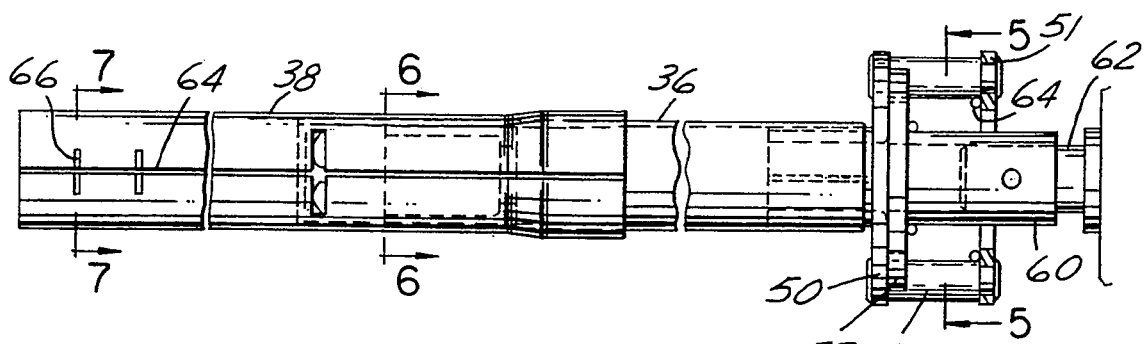
FIG. 4 is a plan view of the tire lift mechanism illustrated in FIG. 3.

FIG. 4 is a plan view of drive assembly 30 prior to assembly. Outer tube 38 and inner tube 36 are telescopically received on each other in a collapsed position. Plates 50 and 51 are on spaced axial sides of plate 57. Drive tube 32 and driven shaft 34 extend coaxially. Drive pins 56 are received within notches 58 in plate 57. Spring 64 biases plate 50 against plate 57.

Figure 5:
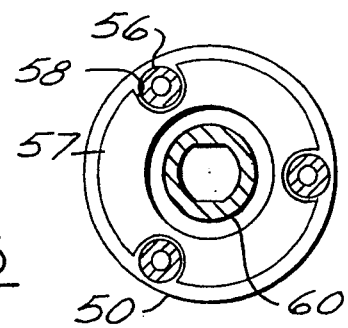
FIG. 5 is a cross-sectional view along line 5—5 as shown in FIG. 4.

FIG. 5 is a cross-sectional view along line 5—5 as shown in FIG. 4. As shown, plate 57 includes a plurality of notches 58 receiving a plurality of drive pins 56. Drive pins 56 may pivot in notches 58 and still transmit rotation.

Figure 6:
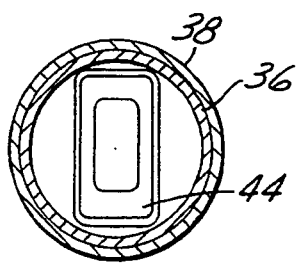
FIG. 6 is a cross-sectional view along line 6—6 as shown in FIG. 4.

FIG. 6 is a view along line 6—6 as shown in FIG. 4. Drive structure 44 is generally rectangular, and receives the pointed end of a jack handle.

Figure 7:
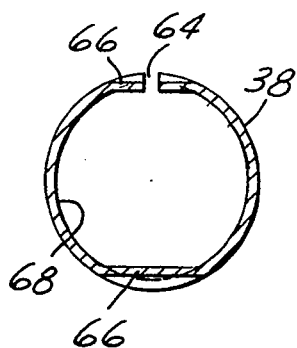
FIG. 7 is a cross-sectional view along line 7—7 as shown in FIG. 4.

FIG. 7 is a cross-sectional view along line 7—7, and shows structure, which will be described below, to facilitate assembly of mechanism 20 to the underside of a vehicle 24. As shown, outer tube 38 includes elongate split 64. Split 64 facilitates the sliding movement of outer tube 38 on inner tube 36. A pair of radial inwardly extending ears 66 are formed in outer tube 38. One extends across split 64. The inner periphery of outer tube 38 is generally cylindrical, other than at the location of ears 66. Ears 66 are spaced 180° from each other.

Figure 8:
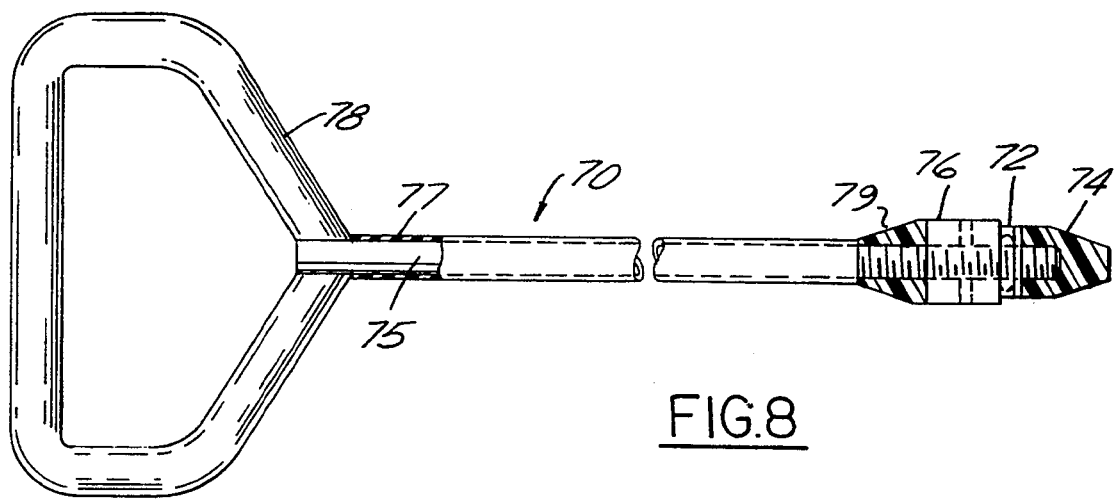
FIG. 8 is a view of a tool for assembling the tire lift mechanism of the present invention.

FIG. 8 is a view of tool 70 for facilitating the assembly of mechanism 20 to underside 24 of a vehicle, Tool 70 consists of lock portion 72, received between forward end 74 and rearward end 76. Lock portion 72 has a cross-section somewhat similar to the cross-section of forward end 74 adjacent lock portion 72. There is one difference, which will be described below. Rearward end 76 has a larger diameter than lock portion 72. Handle 78 is disposed at an opposed end of the tool. A threaded bolt 75 extends through sleeve 77 and threadably receives rearward end 76, lock portion 72 and forward end 74. A threaded plastic member 79 may also be positioned on bolt 75. The use of plastic members 74, 77 and 79 prevents damage to mechanism 20. Preferably, the plastic portions of tool 70, including portions 74 and 79 are formed from a material available under the tradename Derlon TM. Sleeve 77 is preferably formed of a suitable Nylon.

Figure 9:
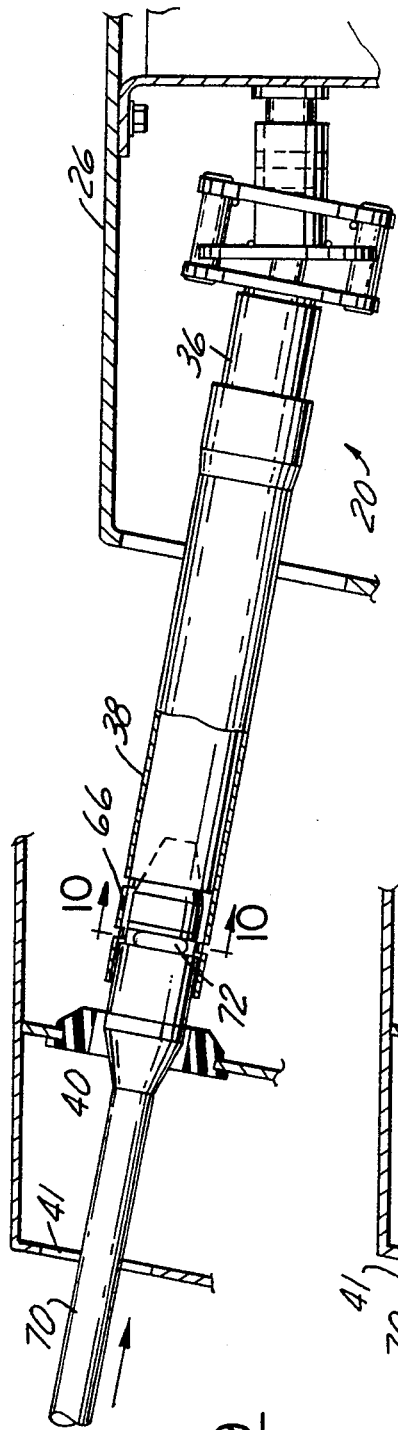
FIG. 9 illustrates the first step in assembling the tire lift mechanism of the present invention to a vehicle.

As shown in FIG. 9, mechanism 20 is first attached to bracket 26. Outer tube 38 is telescopically received on inner tube 36 at a collapsed position. In the past, it has been difficult to mount mechanism 20 to the underside of a vehicle 24, and also position the drive tube within bearing 40. As shown, when mechanism 20 is initially mounted to bracket 26, the outer end of outer tube 38 is not received within bearing 40.

Tool 70 is inserted into the outer end of outer tube 38 until lock portion 72 is axially aligned with ears 66. Rearward end 76, which has a greater outer diameter than lock portion 66 or forward end 74, abuts ears 66 stopping further forward movement of tool 70 into outer tube 38 and defining this axial position.

Figure 10:
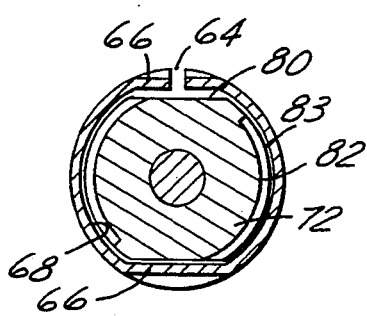
FIG. 10 is a cross-sectional view along line 10—10 as shown in FIG. 9.

FIG. 10 is a cross-sectional view through line 10—10, and shows lock portion 72 aligned with ears 66. Lock portion 72 has a pair of opposed flats 80 which are circumferentially and axially aligned with ears 66. When initially inserting tool 70 one ensures the circumferential alignment of flats 80 with ears 66. Curved lock portions 82 connect flats 80. Forward end 24 has approximately the same cross-section as lock portion 72, but has curved portions 83 with a diameter greater than curved portions 82. When in this initial position, curved portions 82 and 83 are aligned with the curved inner periphery portion 68 of outer tube 38. Curved portions 83 are positioned axially beyond ears 66.

Figure 12:
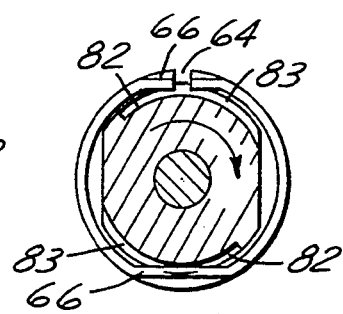
FIG. 12 is a cross-sectional view along line 12—12 as shown in FIG. 11.
Figure 11:
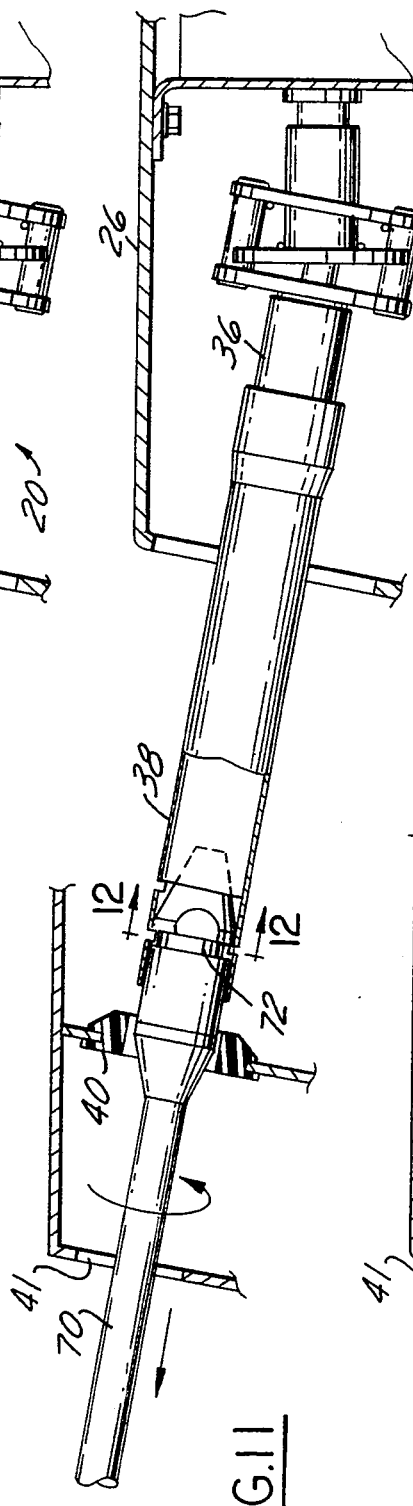
FIG. 11 illustrates a subsequent step in the assembly of the tire lift mechanism.

As shown in FIG. 11, tool 70 is rotated. As shown in FIG. 12, once tool 70 is rotated, curved portions 82 and 83 are now circumferentially aligned with ears 66. Curved portions 83 which are of greater diameter than curved portions 82 now prevent removal of tool 70 from outer tube 38 since they abut ears 66. Tool 70 is pulled outwardly and curved portions 83 pull ears 66 outwardly such that outer tube 38 slides on inner tube 36.

Figure 13:
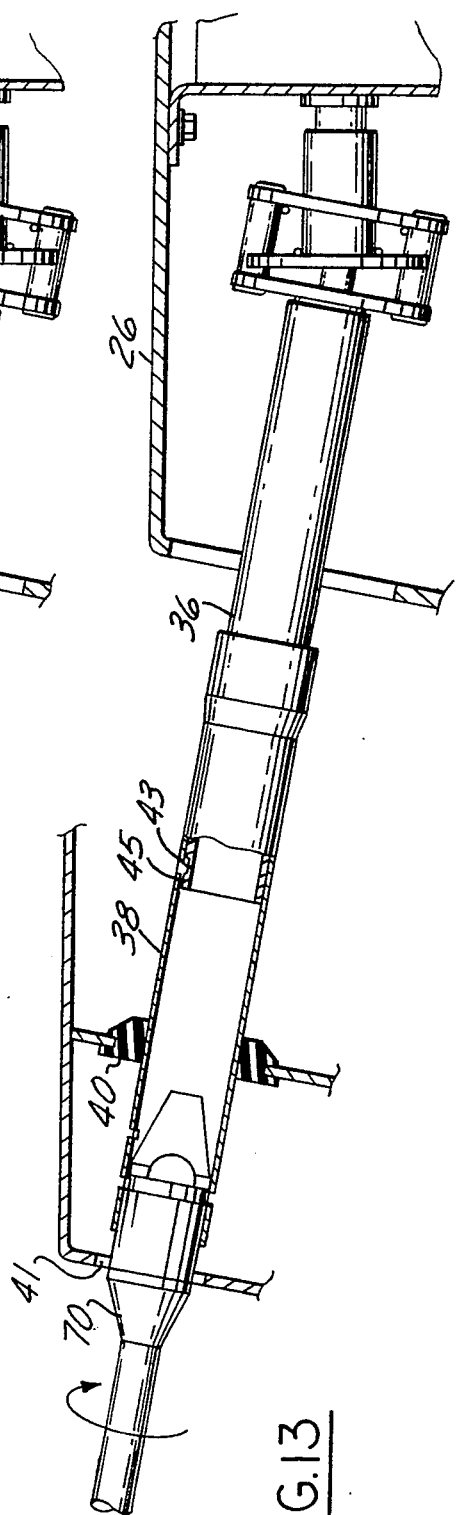
FIG. 13 shows the final assembly of the tire lift mechanism.

Outer tube is pulled outwardly through bearing 40, and is then rotatably received in bearing 40. Mechanism 20 is now in a position such as is illustrated in FIG. 3, and is fully assembled. As shown in FIG. 13, lip 43 snaps into notch 45 and outer tube is locked relative to inner tube 36. Tool 70 is then rotated and removed.

The metal portions of the assembly are preferably formed of sintered powder metals. This increases the strength over prior art assemblies.

A preferred embodiment of the present invention has been disclosed, however, a worker of ordinary skill in the art would recognize that certain modifications would come within the scope of this invention. For that reason the following claims should be studied in order to determine the true scope and content of this invention.

I claim:

1. A tool for facilitating the assembly of a tire lift mechanism, comprising:

a generally cylindrical sleeve extending along a longitudinal axis, said sleeve having two ends;

a handle disposed at one of said ends of said sleeve;

a lock assembly disposed at the other of said ends of said sleeve, said lock assembly including a forward end having curved portions on a first cross-section perpendicular to said longitudinal axis, a rearward end, and a lock portion received between said forward and said rearward end, said lock portion having a second cross-section perpendicular to said longitudinal axis, said second cross-section having a lesser diameter than said curved portions of said first cross-section; and a threaded bolt extending through said sleeve and threadably receiving said rearward end, said lock portion and said forward end.

2. The tool as recited in claim 1, wherein said rearward end includes a cross-section perpendicular to said longitudinal axis having a diameter greater than said first cross-section of said forward end and said second cross-section of said lock portion.

3. The tool as recited in claim 1, wherein said tire lift mechanism includes an outer tube extending along a longitudinal axis, the outer tube including an ear extending radially inwardly from a generally cylindrical inner periphery of the outer tube;

said tool being adapted for insertion into the outer tube to a position such that said lock portion having a smaller diameter is circumferentially aligned with said ear, and tool then being rotated such that said forward end having said curved portions having a larger diameter is positioned axially beyond the ear, and abuts the ear as the tool is pulled outwardly.

4. The tool as recited in claim 1, wherein said tire lift mechanism includes an outer tube extending along a longitudinal axis, the outer tube including an ear extending radially inwardly from a generally cylindrical inner periphery of the outer tube;

said tool being adapted for insertion into the outer tube such that said rearward end abuts the ears stopping inward movement of the tool, said rearward end having a greater diameter than said lock portion and said forward end.

5. A tool for facilitating the assembly of a tire lift mechanism, comprising:

a generally cylindrical sleeve extending along a longitudinal axis, said sleeve having two ends;

a handle disposed at one of said ends of said sleeve;

a lock assembly disposed at the other of said ends of said sleeve, said lock assembly including a forward end having curved portions on a first cross-section perpendicular to said longitudinal axis, a rearward end, and a lock portion received between said forward and said rearward end, said lock portion having a second cross-section perpendicular to said longitudinal axis, said second cross-section having a lesser diameter than said curved portions of said first cross-section; and a first plastic member positioned over said rearward end, a second plastic member positioned over said lock portion, and a third plastic member positioned over said forward end, said plastic members adapted to prevent damage to said tire lift mechanism.

6. The tool as recited in claim 1, further including a threaded plastic member positioned on said bolt adapted to prevent damage to said tire lift mechanism.

7. A tool for facilitating the assembly of a tire lift mechanism, comprising:

a generally cylindrical sleeve extending along a longitudinal axis, said sleeve having two ends;

a handle disposed at one of said ends of said sleeve;

a lock assembly disposed at the other of said ends of said sleeve; said lock assembly including a forward end having curved portions on a first cross-section perpendicular to said longitudinal axis, a rearward end, and a lock portion received between said forward and said rearward end, said lock portion having a second cross-section perpendicular to said longitudinal axis, said second cross-section having a lesser diameter than said curved portions of said first cross-section; and said lock portion including flats extending radially inwardly along a circumferentially outer edge of said second cross-section.

8. The lock portion as recited in claim 7, wherein said tire lift mechanism includes an outer tube extending along a longitudinal axis, the outer tube including an ear extending radially inwardly from a generally cylindrical inner periphery of the outer tube;

said flats of said lock portion being circumferentially and axially aligned with the ears of the outer tube.

* * * * *